United States Patent [19]

Spanides

[11] 4,182,374

[45] Jan. 8, 1980

[54] CONTROL DEVICE FOR REGULATING THE FLOW BETWEEN A SPOUT AND A SHOWER AND CAPABLE OF CONTROLLING THE RATE OF FLOW FROM EACH INDEPENDENTLY OF THE HOT AND COLD FAUCET HANDLES

[76] Inventor: Moschoula Spanides, 82a Themistokleous St., Piraeus, Greece

[21] Appl. No.: 835,293

[22] Filed: Sep. 21, 1977

[30] Foreign Application Priority Data

Sep. 25, 1976 [GR] Greece .................................. 51782

[51] Int. Cl.$^2$ .......................................... F16K 11/07
[52] U.S. Cl. .................. 137/625.48; 137/597
[58] Field of Search ............. 137/625.48, 597

[56] References Cited

U.S. PATENT DOCUMENTS

| | | | |
|---|---|---|---|
| 2,262,291 | 11/1941 | Kuhnle | 137/597 X |
| 2,278,789 | 4/1942 | Kuhnle | 137/597 |
| 2,326,487 | 8/1943 | Overbeke | 251/297 X |
| 3,168,109 | 2/1965 | Klingler | 137/625.48 X |
| 3,542,066 | 11/1970 | Cordova | 137/625.17 X |
| 3,575,207 | 4/1971 | Denner | 251/205 X |
| 3,911,946 | 10/1975 | Humpert et al. | 137/597 X |

FOREIGN PATENT DOCUMENTS

306317 6/1955 Switzerland .......................... 137/597

*Primary Examiner*—Arnold Rosenthal
*Attorney, Agent, or Firm*—Haseltine, Lake & Waters

[57] ABSTRACT

A control device adapted for being connected to hot and cold supplies having a faucet control for selectively diverting the flow of water between two outlets and for regulating the rate of flow from the selected outlet independently of the hot and cold faucet controls comprising a hollow sleeve member having hot and cold water inlets and first and second outlets and a piston slidable in the sleeve for movement between first and second positions. In the first position a first outlet is blocked and the two inlets communicate with the second outlet and in the second position the second outlet is blocked and the two inlets communicate with the first outlet. The piston can assume an intermediate position in which both inlets are blocked and no water flows through the sleeve. As the piston moves from the intermediate position to either of the other positions, the inlets are gradually opened and the rate of flow increases through the inlets to the respective outlet depending upon the direction of movement of the piston.

1 Claim, 5 Drawing Figures

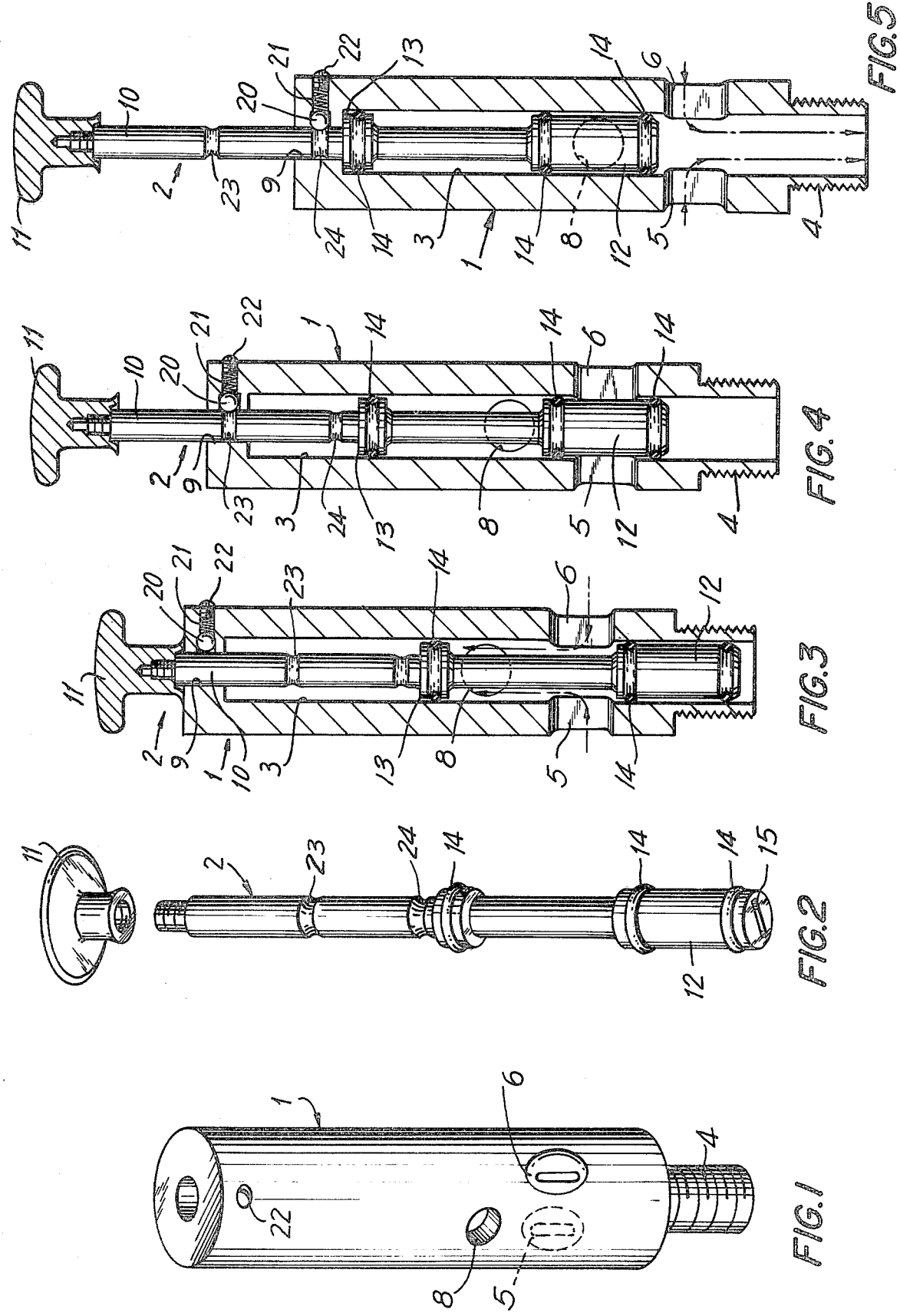

CONTROL DEVICE FOR REGULATING THE FLOW BETWEEN A SPOUT AND A SHOWER AND CAPABLE OF CONTROLLING THE RATE OF FLOW FROM EACH INDEPENDENTLY OF THE HOT AND COLD FAUCET HANDLES

FIELD OF THE INVENTION

The invention relates to a faucet control device for controlling the outflow of water from a faucet at a given temperature and rate of flow without readjusting the water temperature by operating the hot and cold water controls.

The invention is paricularly concerned with a faucet control device which is capable of regulating the rate of flow from two outlets independently of the hot and cold water controls.

The faucet control device is particularly adaptable for selecting a shower outlet or a spout for flow of water and for regulating the rate of flow therefrom, independently of the hot and cold water controls.

The same device, properly adjusted as an one outlet unit, can be used in a kitchen or elsewhere.

BACKGROUND

Conventional devices are known for selecting water flow between a shower and a tub spout and some of these include means for temperature regulation. Such devices are relatively complex in design and construction and they quickly wear out and are costly to produce.

In the case where separate handles are provided for hot and cold water control, it is conventional to control the flow between the shower and the tub spout and to employ the hot and cold water handles to regulate the rate of flow.

SUMMARY OF THE INVENTION

It is an object of the invention to provide a control device which will select the outlet to be fed with water and to control the rate of flow through the selected outlet independently of the hot and cold water control handles.

It is a further object of the invention to provide a device of the above type which is simple in construction, easy to maintain and repair, and is relatively low in cost.

In its broadest aspect, the control device of the invention is capable of regulating the rate of flow of water at an outlet at a pre-adjusted temperature.

In a particular embodiment when used for a shower, the water can be turned on and off without need for readjusting the temperature each time the water is turned back on again.

As a feature of the invention, therefore, the temperature of the water is adjusted only once and the water can be turned off or on as desired.

The invention contemplates an embodiment constituted as apparatus adapted for being connected to hot and cold water supplies having a faucet control for selectively diverting the flow of water between two outlets and for regulating the rate of flow from the selected outlet independently of the hot and cold faucet control, said apparatus comprising a hollow sleeve member having hot and cold water inlets adapted for connection to the hot and cold water supplies, and first and second outlets, and piston means slidably mounted in said sleeve for movement between a first position in which one of said outlets is blocked and the two inlets communicate with the other outlet and a second position in which said other outlet is blocked and the two inlets communicate with said one outlet, said piston means having an intermediate position between the first and second positions in which said inlets are blocked, said piston means in its movement from the intermediate position to either of the other positions gradually opening the inlets to increase the rate of flow through said inlets to the respective outlet.

According to a further feature of the invention the aforesaid embodiment is provided with detent means for holding the piston means in selected of said positions.

The invention will be described hereafter in greater detail in conjuction with the attached drawings.

BRIEF DESCRIPTION OF THE DRAWING

FIG. 1 is a perspective view of a portion of one embodiment according to the invention.

FIG. 2 is a perspective view of a second portion of said embodiment.

FIGS. 3-5 are sectional views showing the apparatus in three different positions of operation.

DETAILED DESCRIPTION

Referring to the drawings, therein is seen a hollow sleeve 1 which slidably receives a piston assembly 2. The sleeve 1 has a cylindrical bore 3 in which the piston 2 is slidably received. At the lower end of the sleeve 1 there is an externally threaded portion 4 adapted for being connected to a conduit, such as, a shower pipe.

The sleeve 1 has two inlets 5 and 6 for the supply, respectively, of hot and cold water. These inlets are respectively adapted for connection to hot and cold water conduits each having a respective control handle (not shown). As seen in FIG. 1, each of the inlets is in the form of an oblong slot which is elongated in the direction of the axis of the cylindrical sleeve 1 for a purpose which will become apparent later.

The sleeve 1 is provided with a second outlet 8 which, for example, can lead to a conduit which terminates in a spout for flow of water into a bath tub.

The upper end of the sleeve is provided with a hole 9 which slidably receives a stem 10 of the piston 2. A handle 11 is detachably secured to the stem by means of a threaded connection at the upper end thereof. The handle facilitates movement of the piston between the positions as shown in FIGS. 3-5.

The piston 2 carrier a portion 12 which is sealably and slidably mounted in the cylindrical bore 3. A second portion 13 is axially spaced from portion 12 and is mounted on the stem 10 also for sealed slidable movement within the cylindrical bore 3. The portions 12 and 13 carry sealing rings 14 in respective grooves to provide the sealing engagement with the cylindrical bore 3.

A slot 15 is provided in the lower portion 12 to facilitate the engagement of the piston to allow the handle 11 to be threadably engaged on the upper end of the stem 10 after the piston has been inserted into the cylindrical bore of the housing.

The piston is axially displaceable in the sleeve between a first inserted position as shown in FIG. 3 and a second retracted position as shown in FIG. 5. In the first position in FIG. 3, the hot and cold water inlets 5 and 6 are in communication with the outlet 8 leading to the tub spout whereas in FIG. 5 the hot and cold water inlets 5 and 6 are in communication with the outlet 4 leading to the shower. Accordingly, by displacing the piston between the first and second positions, selection can be made of water flow to either the tub spout or the shower.

The hot and cold water control handles on the hot and cold water conduits (not shown) can be controlled to regulate the temperature as well as the rate of flow of the incoming water.

By placing the piston in the intermediate position as shown in FIG. 4, the water inlets 5 and 6 are blocked and no water will flow to the outlets 4 or 8. Accordingly, the outflow of water can be temporarily discontinued by placing the piston in the intermediate position.

If water flow is to be regulated either to the bath tub or the shower, the piston is then merely displaced in one axial direction or the other and the water will be at the originally regulated temperature.

The rate of flow to the respective outlets can be regulated by moving the handle and thereby the piston slightly upwards for the bath tub spout, or slightly downwards for the shower. Thus, it is seen that the rate of flow of water to the tub spout or the shower can be regulated depending upon the amount of axial movement of the piston from the intermediate position towards either the first or second positions.

In order to make the rate of flow substantially proportional to the displacement of the piston, the inlets 5 and 6 are in the shape of oblong slots as previously explained.

The position of the piston in the first and second positions is communicated to the user by a detent means which is constituted by a ball 20 which is carried in a corresponding recess in the sleeve and which is urged by a spring 21 mounted in a bore 22 in the sleeve against the stem 10 of the piston. The stem 10 has two axially spaced grooves 23 and 24 which are positioned to be respectively engaged by the ball 20 when the piston is in the intermediate position of FIG. 4 and in the fully retracted position in FIG. 5. The engagement of the ball in the grooves also prevents the piston from descending by its weight particularly after long use when the seal rings 14 may have become slightly worn. The lowered position in FIG. 3 is communicated to the user by the full insertion of the piston and the engagement of handle 11 with the top of the sleeve.

While the invention has been described in conjunction with a specific embodiment thereof, it will become apparent to those skilled in the art that numerous modifications and variations can be made without departing from the spirit and scope of the invention as defined in the appended claims.

What is claimed is:

1. Apparatus adapted for being connected to hot and cold water supplies having a faucet control selectively diverting the flow of water between two outlets and for regulating the rate of flow from the selected outlet independently of the hot and cold faucet control, said apparatus comprising a hollow sleeve member having hot and cold water inlets adapted for connection to the hot and cold water supplies, and first and second outlets, and piston means slidably mounted in said sleeve for movement between a first position in which one of said outlets is blocked and the two inlets communicate with the other outlet and a second position in which said other outlet is blocked and the two inlets communicate with said one outlet, said piston means having an intermediate position between the first and second positions in which said inlets are blocked, said piston means in its movement from the intermediate position to either of the other positions gradually opening the inlets to increase the rate of flow through said inlets to the respective outlet, said first and second outlet are located on opposite sides of said inlets, said inlets being axially aligned and having oblong holes, detent means for holding the piston means in selected ones of said positions and comprising a spring-loaded ball, said sleeve member having a cylindrical bore, said piston means comprising a first piston portion confined for sealed slidable movement in said cylindrical bore, said first outlet being coaxial and coextensive with said bore, said second outlet extending laterally in communication with said bore, said first piston portion in said first position blocking said first outlet and in said second position blocking said second outlet, said pistons means comprising a stem on which said piston portion is secured, said stem being of smaller diameter than said first piston portion, said stem being slidably supported by said sleeve, and a handle on said stem for displacement of said stem and the piston portion thereon, said piston means comprising further a second piston portion secured to said stem in spaced relation from the first piston portion and slidably supported in said cylindrical bore, said stem having two spaced grooves positioned to be respectively engaged by said ball when the piston means is in said intermediate position and in said second position.

* * * * *